United States Patent [19]

Frissora Anthony P. et al.

[11] Patent Number: 4,480,390
[45] Date of Patent: Nov. 6, 1984

[54] APPARATUS AND METHOD FOR ALIGNING AN OBJECT WITH RESPECT TO TOP-DEAD CENTER OF A WHEEL

[75] Inventors: Frissora Anthony P., Mendham; Ralph R. Saunders, Lafayette, both of N.J.

[73] Assignee: Allied Corporation, Morris Township, Morris County, N.J.

[21] Appl. No.: 419,675

[22] Filed: Sep. 20, 1982

[51] Int. Cl.³ ............................................. G01B 11/26
[52] U.S. Cl. .................................. 33/286; 33/185 R; 33/275 R; 33/371
[58] Field of Search ............. 33/286, 283, 263, 185 R, 33/275 R, 182, 180 R, 181 R, 181 AT, 180 AT, 371

[56] References Cited

U.S. PATENT DOCUMENTS

| | | | |
|---|---|---|---|
| 2,198,836 | 4/1940 | Patton | 33/286 |
| 2,472,241 | 6/1949 | Wilson | 33/185 R |
| 2,557,029 | 6/1951 | Griffin | 33/286 X |
| 3,457,650 | 7/1969 | Hagmayer | 33/185 R |
| 4,319,406 | 3/1982 | Pehrson et al. | 33/182 X |

*Primary Examiner*—William D. Martin, Jr.
*Attorney, Agent, or Firm*—Paul Yee; Ernest D. Buff; Gerhard H. Fuchs

[57] ABSTRACT

The invention provides an optical alignment method and apparatus for aligning a selected object with respect to an top-dead-center portion of a substantially circular wheel. A base mounted on the wheel has a positioning mechanism for effecting alignment wth the top-dead-center of the wheel. A mirror mounted on the base reflects an image of the selected object. The mirror has a reference mechanism associated therewith for referencing the image to indicate the relative alignment of the selected object with respect to the wheel top-dead-center. A sighting mechanism aligned with the reference mechanism allows accurate observation of the relative alignment between the image and the reference mechanism. The object is then moved until the image thereof is selectively aligned with the reference mechanism.

7 Claims, 7 Drawing Figures

APPARATUS AND METHOD FOR ALIGNING AN OBJECT WITH RESPECT TO TOP-DEAD CENTER OF A WHEEL

BACKGROUND OF THE INVENTION

1. Field of the Invention

The invention relates to a method and apparatus for aligning a selected object with respect to the top-dead-center of a circular wheel. More particularly, the invention relates to an apparatus useful for aligning an extrusion nozzle with respect to the top-dead-center portion of a chilled casting wheel.

2. Description of the Prior Art

In the production of glassy alloy continuous filaments, an appropriate molten alloy is typically quenched at extreme quench rates, usually at least about $10^{4°}$ C. per second by extruding the molten alloy from a pressurized reservoir through an extrusion nozzle onto a high speed rotating quench surface, as is representatively shown in U.S. Pat. No. 4,142,571 for "Continuous Casting Method for Metallic Strips" issued Mar. 6, 1978 to M. Narasimhan, hereby incorporated by reference. Such filaments are necessarily thin, typically about 25 to 100 microns, owing to the extreme heat transfer rates required to prevent substantial crystallization, though considerable selectivity may be exercised respecting the transverse dimensions and cross section of the filament. The quench surface is often provided by an annular outer peripheral surface of a vertically disposed wheel which has its rotational axis disposed substantially horizontal.

To obtain filaments of uniform cross section and uniform mechanical properties, it is necessary to align the nozzle substantially parallel to the wheel rotational axis. If the nozzle is twisted with respect to the wheel axis, extruded molten metal will not contact the chill quench surface uniformly across the width of the surface. The resultant difference in quench rates will cause variations in the properties of the cast material.

The process of aligning the extrusion nozzle over the wheel top-dead-center is generally quite cumbersome because the extrusion apparatus is located over the wheel. As a result, it is not possible to sight directly down to the top of the wheel. In ordinary alignment procedures, an experienced technician uses a ruled scale to estimate the nozzle alignment. This is necessarily inaccurate and depends on the individual judgment and experience of the technician. Consequently, there remains a need for a convenient, easy to use and consistently accurate device for aligning extrusion nozzles with respect to the top-dead-center of a high speed rotating casting wheel.

SUMMARY OF THE INVENTION

The invention provides an optical alignment apparatus that is versatile, accurate and can be easily used to align a selected object with respect to the top-dead-center portion of a substantially circular wheel. Generally stated, the apparatus has a base mounted on the wheel and a positioning means for effecting alignment with the wheel top-dead-center. A mirror mounted on the base and aligned with the wheel top-dead-center reflects an image of the selected object. A reference means associated with the mirror references the image to indicate the relative alignment of the selected object with respect to the wheel top-dead-center, and a sighting means aligned with the reference means allows sighting of the reference means and the reflected image to determine the relative alignment position of the image with respect to the reference means.

In addition, the invention provides a method for aligning the selected object with respect to the top-dead-center of the substantially circular wheel. A mirror is postioned on the wheel in alignment with the wheel top-dead-center to reflect an image of the object. The image is referenced to a reference means associated with the mirror which indicates the relative alignment of the object with respect to the wheel top-dead-center. The image and reference means are sighted with a sighting means aligned with the reference means to determine the relative alignment of said image with respect to the reference means. Then, the object is moved until the image thereof is selectively aligned with the reference means, as observed through the sighting means.

The apparatus of the invention provides a versatile device that can be used with wheels of different diameters without modification. The device is quickly mountable and removeable from the wheel, and since it allows alignment of the selected object while viewing from the side of the wheel, the device is more convenient, more effective and easier to use than devices that require sighting the wheel from above. In addition, it is a portable, compact device that is considerably more accurate and precise than the ruled scales ordinarily used to align objects over wheels.

BRIEF DESCRIPTION OF THE DRAWINGS

The invention will be more fully understood and further advantages will become apparent when reference is made to the following detailed description of the preferred embodiment of the invention in the accompanying drawings in which.

DESCRIPTION OF THE PREFERRED EMBODIMENT

Although the preferred embodiments of the invention are described in the context of aligning an extrusion nozzle over a casting wheel, it is readily apparent that the device is suitable for aligning various types of objects over the top-dead-center of cylindrically shaped items. Thus, for the purposes of the present invention and as used in the specification and claims, the term "wheel" is intended to encompass circularly shaped objects, including circular rollers, discs, wheels, annular rings and the like.

Figure 1:
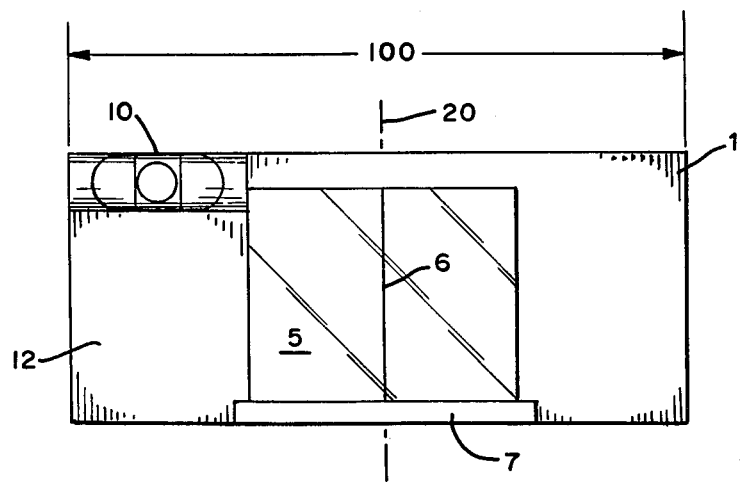
FIG. 1 is a top plan view of the alignment apparatus of the invention.
Figure 2:
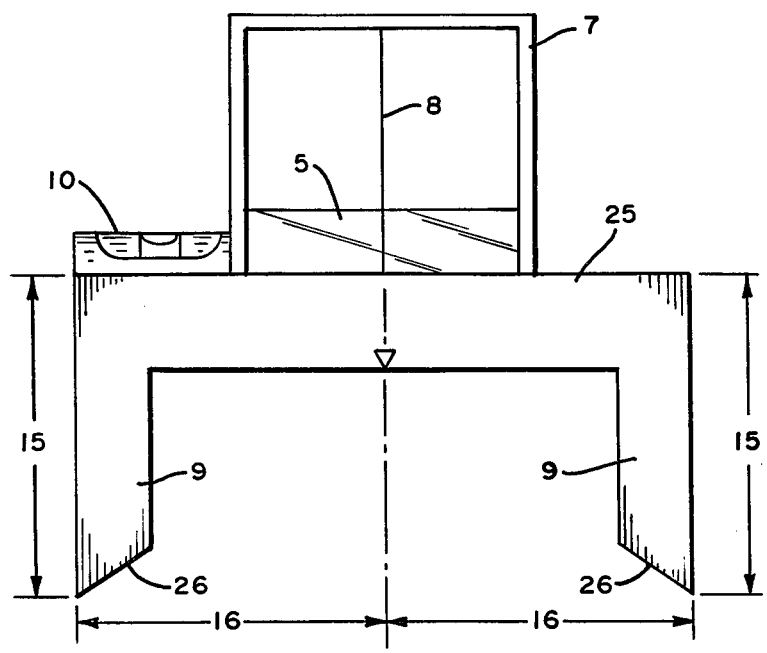
FIG. 2 is a front plan view of the apparatus.
Figure 3:
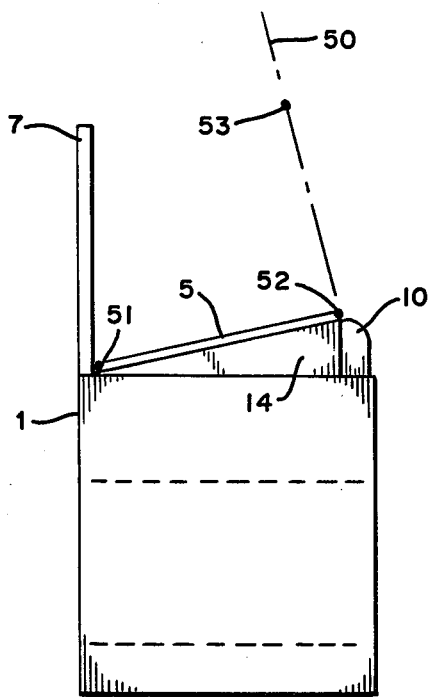
FIG. 3 is a side plan view of the apparatus.
Figure 4:
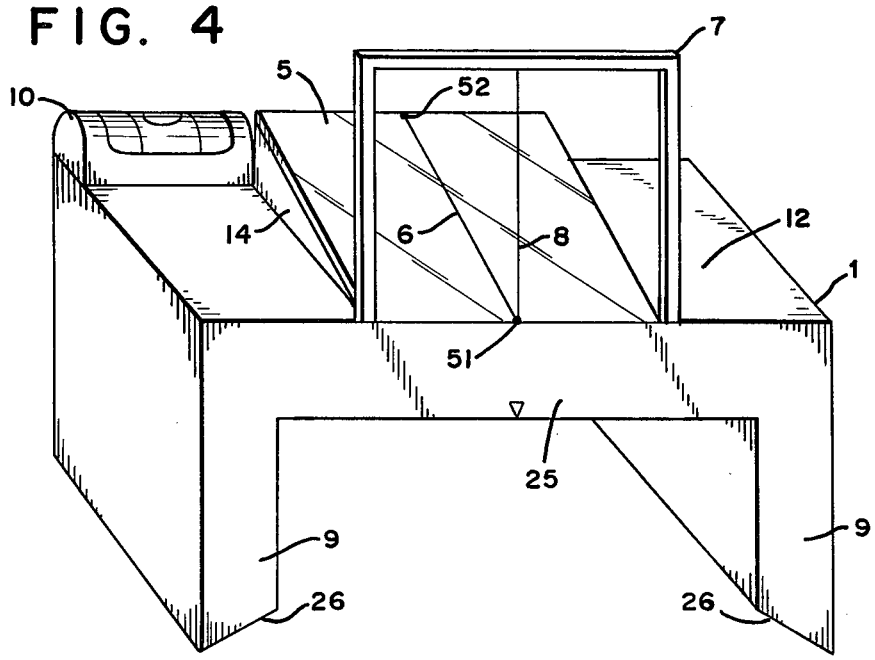
FIG. 4 is an isometric view of the apparatus.
Figure 5:
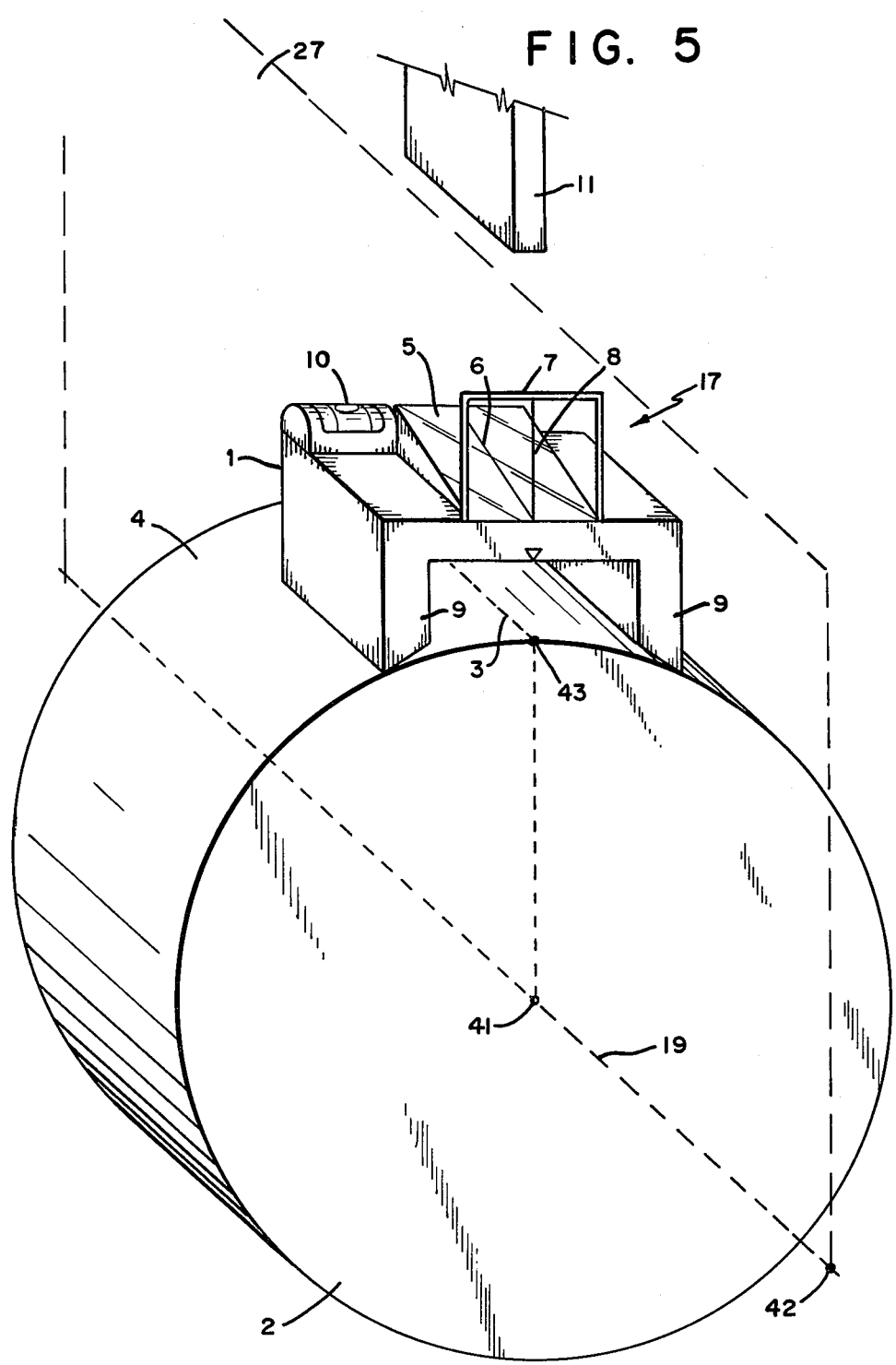
FIG. 5 is an isometric view of the apparatus mounted on a vertically disposed wheel to align a nozzle over the wheel top-dead-center.

Referring to FIG. 5 of the drawings, casting wheel 2 is shown vertically disposed with wheel rotational axis 19 lying substantially horizontal. The alignment device of the invention, shown generally at 17, is mounted on the outer peripheral, circumferential surface 4 of wheel 2 to align a casting nozzle 11 with the wheel top-dead-center portion 3. Wheel top-dead-center 3 is represented by a line through a top-dead-center point of wheel 2 extending parallel to wheel axis 19.

FIGS. 1, 2, 3 and 4 illustrate the structure of a preferred embodiment. The alignment device has a base 1. Positioning means, comprised of leg elements 9 extending from base 1 and a bubble level indicator 10, align the base with the top-dead-center of the wheel. A mirror, such as planar mirror 5 mounted on base 1, reflects an image of the selected object, and a reference means, such as a scribe line 6 scribed on the mirrored surface of mirror 5, indicates the relative alignment of the selected object with respect to the wheel top-dead-center. A sighting means, comprised of sight frame 7 and sight line 8, is aligned with the reference means to allow accurate observation and determination of the relative position of the reflected image with respect to the reference means.

Base 1 is a rectangular solid body or the like having downward extending leg elements 9 connected thereto. Various combinations of the size and number of the legs can be used, provided a preselected portion of base 1 is suitably aligned with the wheel top-dead-center portion 3. In the shown embodiment, two leg elements 9 are connected to the opposite ends of base 1, positioned substantially perpendicular to base top surface 12 and substantially parallel to the transverse edges of base 1. The legs are of equal length 15 measured from the top surface 12 of base 1 and at equal distances 16 from the transverse center line 20 of the base. In addition, leg mounting surfaces 26, which contact the wheel, are shaped to be bilaterally symmetric about center line 20. Thus, when base 1 is mounted on top of the peripheral surface of a vertically disposed circular wheel with the longitudinal dimension 100 of surface 12 oriented in a horizontal position, the described geometry of base 1 and legs 9 positions the transverse center line 20 of base 1 parallel with the wheel axis 19 and directly over the wheel top-dead-center 3. A suitable level indicator, such as bubble level 10, is adapted to indicate when surface 12 is in the desired horizontal position. It is readily apparent that as long as leg elements 9 are of equal length and symmetrically contact the wheel peripheral surface 4 on each side of wheel top-dead-center 3, the wheel diameter does not affect the use of the alignment device of the invention. To view the alignment of a selected object, such as casting nozzle 11, with respect to the wheel top-dead-center 3, a mirror 5 is mounted on surface 12. Preferably, mirror 5 is a front surfaced mirror, and is inclined at a suitable angle by inclined support 14 to facilitate viewing of the reflected image of nozzle 11. For example, an incline of about 15° to 30° is convenient. By aligning mirror 5 over the transverse center line 20 of base 1, it is readily apparent that mirror 5 is effectively aligned over the wheel top-dead-center 3.

A reference means comprised of scribe line 6 scribed on the mirrored surface of mirror 5 directly over base center line 20, references the reflected image of nozzle 11 to indicate the relative alignment of the nozzle with respect to the wheel top-dead-center 3. While a scribe line 6 located directly on mirror 5 is preferred, a reference line located coplanar with a plane 27 defined by a first point 41 located at the center of wheel 2, a second point 42 located on the wheel axis 19, and a third point 43 located at the wheel top-dead-center would be equivalent.

Figure 6:
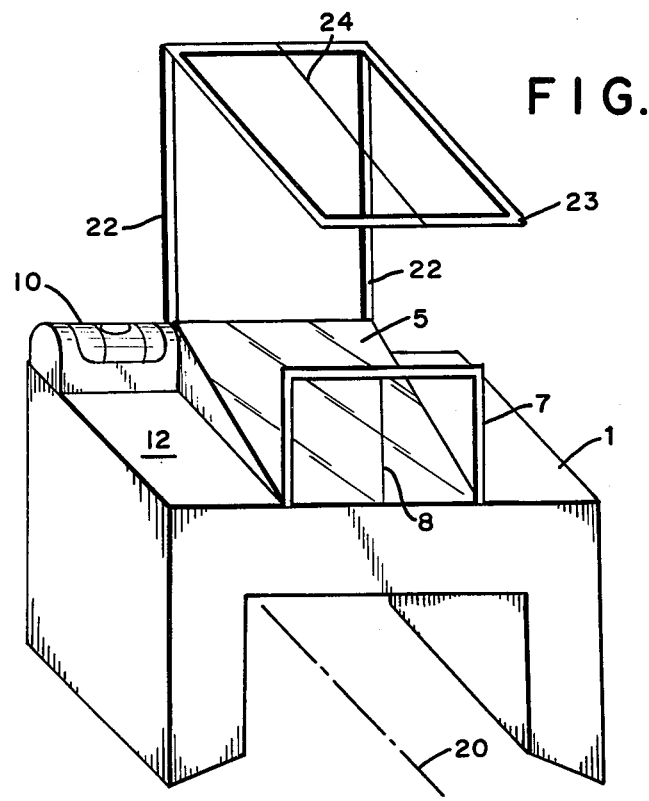
FIG. 6 is an isometric view of a second embodiment of the invention.

FIG. 6 shows a representative, alternate position for such a reference line. Two equal length post elements 22, disposed perpendicular to surface 12 and parallel to each other, support a reference frame 23 over base 1. Frame 23 forms a planar rectangle extending over mirror 5 approximately perpendicular to post elements 22, although other angles of extension would also be suitable. Reference hairline 24 is positioned in the plane of frame 23 directly over base transverse centerline 20. Thus, when base 1 is positioned on wheel 2 with surface 12 horizontal, reference line 24 becomes coplanar with plane 27. Mirror 5 reflects an image of reference line 24 which can be viewed through a suitable sighting means.

Referring again to FIGS. 1, 2, 3 and 4, a sighting means is comprised of sight frame 7 and sight hairline 8. Frame 7 is suitably connected to base 1 to support sight line 8 and provide a consistent sighting position from which to accurately view scribe line 6 and the reflected image of nozzle 11. Visual alignment of sight line 8 with scribe line 6 avoids the effects of parallax when viewing mirror 5 to determine the linear and angular displacements of nozzle 11 with respect to scribe line 6. In the shown embodiment, frame 7 delimits a planar rectangle mounted at front surface 25 of base 1 and extending normal to top surface 12. Frame 7 retains hair line 8 therein to extend normal to surface 12 directly over base transverse centerline 20.

Figure 7:
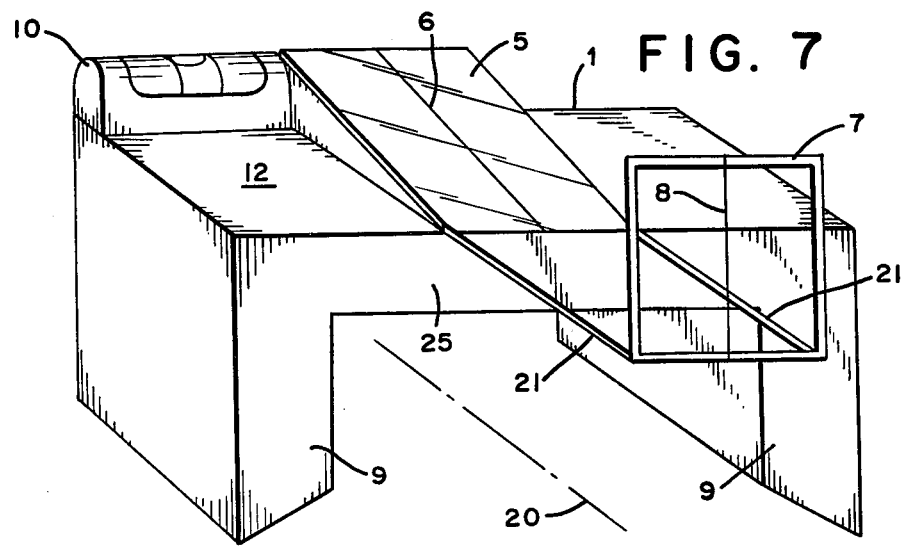
FIG. 7 is an isometric view of a third embodiment of the invention.

Although sight frame 7 and sight line 8 are shown directly connected perpendicular to surface 12, it is readily apparent that sight line 8 could be located at various locations provided it is properly calibrated with respect to scribe line 6 such that optical alignment of sight line 8 with scribe line 6 correctly references and indicates the position of nozzle 11 with respect to wheel top-dead-center 3. For example, frame 7 and sight line 8 can be spaced away from base 1 on suitable extension elements 21 as representatively shown in FIG. 7. Extension elements 21 are parallel, equal in length and symmetrically attached to base 1 on each side of transverse centerline 20 approximately normal to front surface 25. The increased separation distance between scribe line 6 and sight line 8 provides greater alignment accuracy. However, if the separation distance is too great the viewer cannot simultaneously focus his eyes on both the scribe line and the sight line, unless additional optics are incorporated. Thus, the preferred separation distance is about 5 to 8 centimeters. Also, scribe line 6 and sight line 8 should be as thin as practicable to increase the accuracy of the alignment device.

To cast certain glassy metal alloys, nozzle 11 may need to be offset from wheel top-dead-center 3 by a discrete distance. In such case, scribe line 6 may be suitably offset to provide the required reference line, or additional scribe lines may be added to calibrate the device and enable it to properly indicate the desired offset. Corresponding adjustments of sight line 8 may also be required to properly sight scribe line 6 and the reflected image.

During use of the apparatus, the device 17 is placed on top of peripheral surface 4 of wheel 2 and positioned such that bubble level indicator 10 indicates a level, horizontal position of base surface 12. Nozzle 11 is moved to an approximate position over wheel 2 and device 17. A viewer sights mirror 5 through sight frame 7 and visually aligns sight line 8 with scribe line 6 by appropriately positioning his head and eyes. So positioned, the viewer can accurately observe the relative position of the reflected image of nozzle 11 with respect to scribe line 6. Nozzle 11 is then translated and twisted to align it with scribe line 6 as desired and thereby position it with respect to the top-dead-center 3 of wheel 2.

Having thus described the invention in rather full detail, it will be understood that these details need not be strictly adhered to but that various changes and modifications may suggest themselves to one skilled in the art, all falling within the scope of the invention as defined by the subjoined claims.

We claim:

1. An optical alignment apparaus adapted to align a selected object with respect to a top-dead-center portion of a substantially circular wheel, comprising:
   (a) a base adapted to mount on said wheel and having a top surface longitudinal dimension;
   (b) positioning means for aligning said base with said wheel top-dead-center portion, said positioning means comprised of two leg elements connected to said base and adapted to provide a substantially horizontal orientation of said longitudinal dimension when the transverse center line of said base is aligned over said wheel top-dead-center and a bubble level indicator for indicating said horizontal orientation of said base;
   (c) a mirror mounted on said base and aligned with said wheel top-dead-center to reflect an image of said object;
   (d) a reference line located coplanar with a plane defined by a first point at the center of said wheel, a second point on the axis of rotation of said wheel and a third point at said wheel top-dead-center for indicating the relative alignment of said object with respect to said wheel top-dead-center; and
   (e) a sighting line, which can be placed in visual alignment with said mirror and reference line to observe and determine the relative alignment of said image with respect to said reference line.

2. An optical alignment apparatus as recited in claim 1, wherein said sighting line comprises:
   (a) a frame mounted on said base and extending normal to a top surface of the base; and
   (b) a hairline which is retained in said frame and which extends normal to said base top surface at a position directly over said base transverse centerline.

3. An optical alignment apparatus as recited in claim 1, wherein said sighting line comprises;
   (a) two parallel extension elements symmetrically attached to said base on each side of said transverse centerline;
   (b) a frame connected to said extension elements and spaced away from said base, said frame extending normal to a top surface of said base; and
   (c) a hairline which is retained in said frame and which extends normal to said base top surface at a position directly over said base transverse centerline.

4. An optical alignment apparatus as recited in claim 1, wherein said reference line is a reference hairline located above said mirror and directly over said base transverse centerline; said reference hairline being coplanar with a plane defined by a first point at the center of said wheel, a second point on the axis of rotation of said wheel and a third point at said wheel top-dead-center when said base is placed on said wheel with said longitudinal dimension in the horizontal position; and said mirror reflecting an image of said reference hairline.

5. The apparatus as recited in claim 1 wherein said reference line is a scribe line on said mirror.

6. A method for aligning a selected object with respect to a top-dead-center portion of a substantially circular wheel, comprising the steps of:
   (a) positioning a mirror on said wheel directly over said wheel top-dead-center to reflect an image of said object;
   (b) referencing said image to a reference line located coplanar with a plane defined by a first point at the center of said wheel, a second point on the axis of rotation of said wheel and a third point at said wheel top-dead-center;
   (c) sighting said image with a sighting line placed in visual alignment with the mirror and reference line to observe and determine the relative alignment of said image with respect to said reference means; and
   (d) moving said object until said image thereof is selectively aligned with said reference line, as observed through said sighting means.

7. A method as recited in claim 6 wherein said positioning step (a) comprises:
   (a) positioning a base on said wheel in alignment with said wheel top-dead-center, said base having two leg elements connected thereto which are adapted to provide a substantially horizontal orientation of a longitudinal dimension of a top surface of said base when the base transverse center line is aligned over said wheel top-dead-center, and said base having a level indicator which indicates said horizontal orientation; and
   (b) mounting said mirror on said base directly over said wheel top-dead-center to reflect an image of said object.

* * * * *